United States Patent
Hsu

(10) Patent No.: US 8,422,387 B2
(45) Date of Patent: Apr. 16, 2013

(54) METHOD AND APPARATUS OF HANDLING UPLINK INFORMATION UNDER CARRIER AGGREGATION IN A WIRELESS COMMUNICATION SYSTEM

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 490 days.

(21) Appl. No.: 12/724,429

(22) Filed: Mar. 16, 2010

(65) Prior Publication Data

US 2010/0232385 A1  Sep. 16, 2010

Related U.S. Application Data

(60) Provisional application No. 61/160,350, filed on Mar. 16, 2009.

(51) Int. Cl.
*H04L 1/00* (2006.01)
*H04W 4/00* (2009.01)

(52) U.S. Cl.
USPC .......................................... 370/252; 370/328

(58) Field of Classification Search .................. None
See application file for complete search history.

(56) References Cited

U.S. PATENT DOCUMENTS

| 2006/0280142 | A1 | 12/2006 | Damnjanovic |
| 2009/0303954 | A1* | 12/2009 | Guo ............................. 370/329 |
| 2012/0099453 | A1* | 4/2012 | Sagfors et al. ............... 370/252 |
| 2012/0113845 | A1* | 5/2012 | Kim et al. ..................... 370/252 |

OTHER PUBLICATIONS

3GPP TS 36.321 "Evolved Universal Terrestrial Radio Access (E-UTRA) Medium Access Control (MAC) protocol specification (Release 8)" v.8.4.0, Dec. 2008.
3GPP TS 36.331 "Evolved Universal Terrestrial Radio Access (E-UTRA) Radio Resource Control (RRC) Protocol specification (Release 8)" v.8.4.0, Dec. 2008.
Huawei, "PUCCH design for carrier aggregation", 3GPP TSG RAN WG1 Meeting #56, R1-090813, Feb. 9-13, 2009, pp. 1-6, XP-050318670, Athens, Greece.

\* cited by examiner

*Primary Examiner* — Clemence Han
(74) *Attorney, Agent, or Firm* — Winston Hsu; Scott Margo

(57) ABSTRACT

A method of handling uplink information under carrier aggregation for a MAC layer of a UE in a wireless communication system includes receiving uplink data from a higher layer of the UE, triggering a request for requesting UL-SCH resource on at least one of a plurality of component carriers according to whether a PUCCH resource is configured on the at least one of the plurality of component carriers in a current TTI when no UL-SCH resource is available for transmitting the uplink data in the current TTI, and instructing a lower layer of the UE to transmit the request on the at least one of the plurality of component carriers.

11 Claims, 14 Drawing Sheets

METHOD AND APPARATUS OF HANDLING UPLINK INFORMATION UNDER CARRIER AGGREGATION IN A WIRELESS COMMUNICATION SYSTEM

CROSS REFERENCE TO RELATED APPLICATIONS

This application claims the benefit of U.S. Provisional Application No. 61/160,350, filed on Mar. 16, 2009 and entitled "METHOD AND APPARATUS FOR HANDLING UPLINK INFORMATION WITH CARRIER AGGREGATION IN A WIRELESS COMMUNICATIONS SYSTEM", the contents of which are incorporated herein.

BACKGROUND OF THE INVENTION

1. Field of the Invention

A method and apparatus of handling uplink information under carrier aggregation in a wireless communication system are provided, and more particularly, to a method and apparatus for handling uplink information including scheduling request (SR), buffer status report (BSR), and power headroom report (PHR) under carrier aggregation in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). Architecture of the radio interface protocol of the LTE system includes three layers, the Physical Layer (L1), the Data Link Layer (L2), and the Network Layer (L3). A control plane of L3 is a Radio Resource Control (RRC) layer, and L2 is further divided into a Packet Data Convergence Protocol (PDCP) layer, a Radio Link Control (RLC) layer, and a Medium Access Control (MAC) layer.

According to the UE MAC specification, a scheduling request (SR) is triggered for requesting uplink shared channel (UL-SCH) resource for new transmission when no UL-SCH resource is available in a current transmission time interval (TTI). In detail, when no UL-SCH resource is available and the UE has no valid physical uplink control channel (PUCCH) resource for the SR in the current TTI, the UE MAC layer initiates a Random Access procedure, and cancels all pending SRs. When no UL-SCH resource is available and the UE has a valid PUCCH resource for the SR in the current TTI while the current TTI is not a part of a measurement gap, the UE MAC layer instructs the physical layer to signal the SR on the PUCCH for each TTI. A triggered SR is considered as pending until UL-SCH resource is granted for new transmission.

According to the UE MAC specification, a buffer status reporting procedure is used to provide a serving eNB with information about the amount of data available for transmission in an UL transmission buffer of the UE. A buffer status report (BSR) is triggered when a triggering event occurs, and is categorized by regular BSR, periodic BSR, and padding BSR accordingly. For example, a regular BSR is triggered when UL data, which belongs to a logical channel with higher priority than those for which data already existed in the transmission buffer, arrives at the transmission buffer, when a serving cell change occurs, or when a retransmission BSR timer expires and the UE has data available for transmission. Triggering events which cause the periodic BSR and padding BSR are omitted herein. The regular BSR, the periodic BSR, and the padding BSR are reported by different formats including long BSR, short BSR, and truncated BSR. How to decide the BSR format depends on the number of logical channel groups which have buffered data and the number of padding bits.

When the buffer status reporting procedure determines that at least one BSR has been triggered since the last transmission of a BSR or this is the first time that at least one BSR is triggered, and the UE has UL-SCH resource allocated for new transmission for the current TTI, the UE MAC layer instructs a multiplexing and assembly procedure to generate a BSR MAC control element that is included in a MAC protocol data unit (PDU), and controls associated timers, and thereby the BSR is reported on the UL-SCH resource. However, when the UE has no UL resource allocated for new transmission in the current TTI and a regular BSR has been triggered, an SR is triggered. Note that a BSR is triggered intends that a BSR trigger is generated, and the BSR is reported when UL-SCH resource for new transmission arrives. A triggered BSR (or said a BSR trigger) is considered as pending until it is cancelled by UL-SCH resource for new transmission. When the BSR is reported, all pending BSRs are cancelled.

According to the UE MAC specification, a power headroom reporting procedure is used to provide the serving eNB with information about the difference between the UE maximum transmit power and the estimated power for UL-SCH transmission. A power headroom report (PHR) is triggered when a triggering event occurs, e.g. when a prohibit PHR timer expires and the path loss has changed more than a specific value since the last PHR when UE has UL resources for new transmission, a PHR is triggered. When the UE has UL resources allocated for new transmission in the current TTI and the power headroom reporting procedure determines that a PHR has been triggered since the last transmission of a PHR, the UE MAC layer obtains the value of the power headroom from the physical layer, instructs the multiplexing and assembly procedure to generate a PHR MAC control element based on the value reported by the physical layer, and performs related steps, so that the PHR is reported on the UL-SCH resource. The PHR MAC control element is included in a MAC PDU; 2 bits in the beginning of the PHR MAC control element are reserved bits, and a 6-bit power headroom filed for indicating the power headroom level follows.

Recently, the 3GPP is involved in the further advancements for E-UTRA and proposes an LTE-Advanced (LTE-A) system as an enhancement of the LTE system. Carrier aggregation, where two or more component carriers are aggregated, is introduced into the LTE-A system in order to support wider transmission bandwidths, e.g. up to 100 MHz and for spectrum aggregation. A UE of the LTE-A system utilizes multiple component carriers instead of a single carrier used in the former LTE system, to establish multiple links for simultaneously receiving and transmitting on each component carrier. Up to now, the abovementioned SR, BSR, PHR, and associated procedures under carrier aggregation are not clearly specified in the current MAC specification of the LTE-A system.

SUMMARY OF THE INVENTION

A method of handling uplink information under carrier aggregation for a UE in a wireless communication system and related communication device are provided.

A method of handling uplink information under carrier aggregation for a MAC layer of a UE in a wireless communication system is provided. The method includes receiving uplink data from a higher layer of the UE, triggering a request for requesting UL-SCH resource on at least one of a plurality of component carriers according to whether a PUCCH resource is configured on the at least one of the plurality of component carriers in a current TTI when no UL-SCH resource is available for transmitting the uplink data in the current TTI, and instructing a lower layer of the UE to transmit the request on the at least one of the plurality of component carriers.

A communication device of a wireless communication system for handling uplink information under carrier aggregation is provided. The communication device includes a receiving unit for receiving uplink data from a higher layer of the communication device, a triggering unit coupled to the receiving unit for triggering a request for requesting UL-SCH resource on at least one of a plurality of component carriers according to whether a PUCCH resource is configured on the at least one of the plurality of component carriers in a current TTI when no UL-SCH resource is available for transmitting the uplink data in the current TTI, and a control unit coupled to the triggering unit for instructing a lower layer of the communication device to transmit the request on the at least one of the plurality of component carriers.

A method of handling uplink information under carrier aggregation for a MAC layer of a UE in a wireless communication system is provided. The method includes detecting whether a triggering event occurs, triggering a BSR on at least one of a plurality of component carriers when the triggering event occurs, and instructing a lower layer of the UE to report the BSR according to at least one uplink grant for new transmission.

A communication device of a wireless communication system for handling uplink information under carrier aggregation is provided. The communication device includes a detecting unit for detecting whether a triggering event occurs, a triggering unit coupled to the detecting unit for triggering a BSR on at least one of a plurality of component carriers when the triggering event occurs, and a control unit coupled to the triggering unit for instructing a lower layer of the communication device to report the BSR according to at least one uplink grant for new transmission.

A method of handling uplink information under carrier aggregation for a MAC layer of a UE in a wireless communication system is provided. The method includes detecting whether a triggering event occurs on each of a plurality of component carriers, triggering a PHR corresponding to one of the plurality of component carriers when the triggering event occurs on the component carrier, and instructing a lower layer of the UE to report at least one triggered PHR according to at least one uplink grant for new transmission.

A communication device of a wireless communication system for handling uplink information under carrier aggregation is provided. The communication device includes a detecting unit for detecting whether a triggering event occurs on each of a plurality of component carriers, a triggering unit coupled to the detecting unit for triggering a PHR corresponding to one of the plurality of component carriers when the triggering event occurs on the component carrier, and a control unit coupled to the triggering unit for instructing a lower layer of the communication device to report at least one triggered PHR according to at least one uplink grant for new transmission.

These and other objectives will no doubt become obvious to those of ordinary skill in the art after reading the following detailed description of the preferred example that is illustrated in the various figures and drawings.

DETAILED DESCRIPTION

Figure 1:
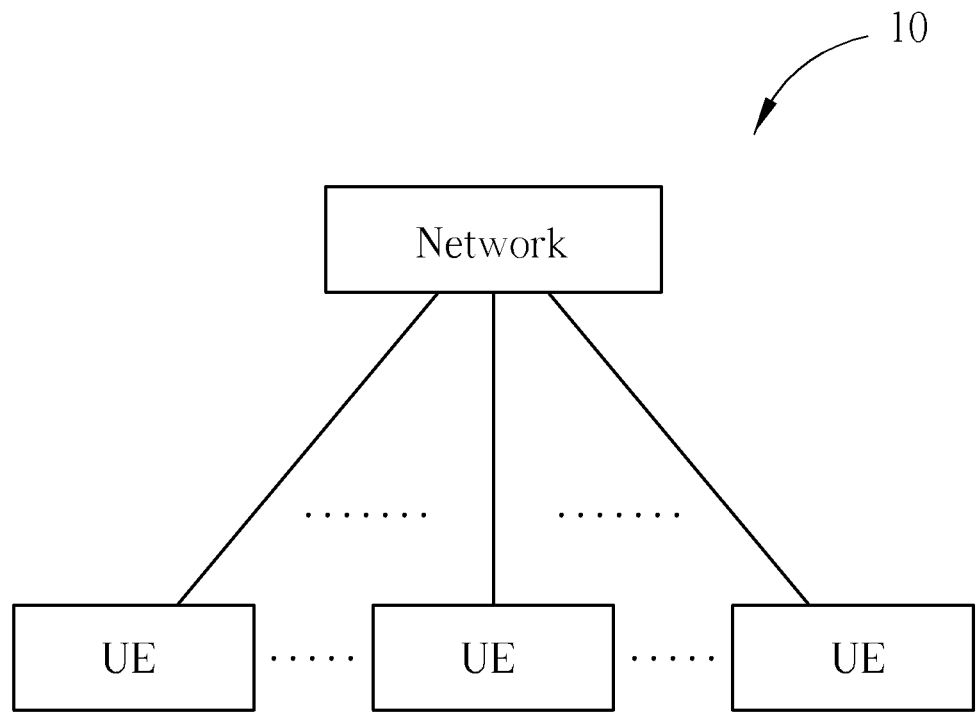
FIG. 1 is a schematic diagram of a conventional wireless communication system.

Please refer to FIG. 1, which is a schematic diagram of a wireless communication system 10. The wireless communication system 10 is a Long-Term Evolution advanced (LTE-A) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
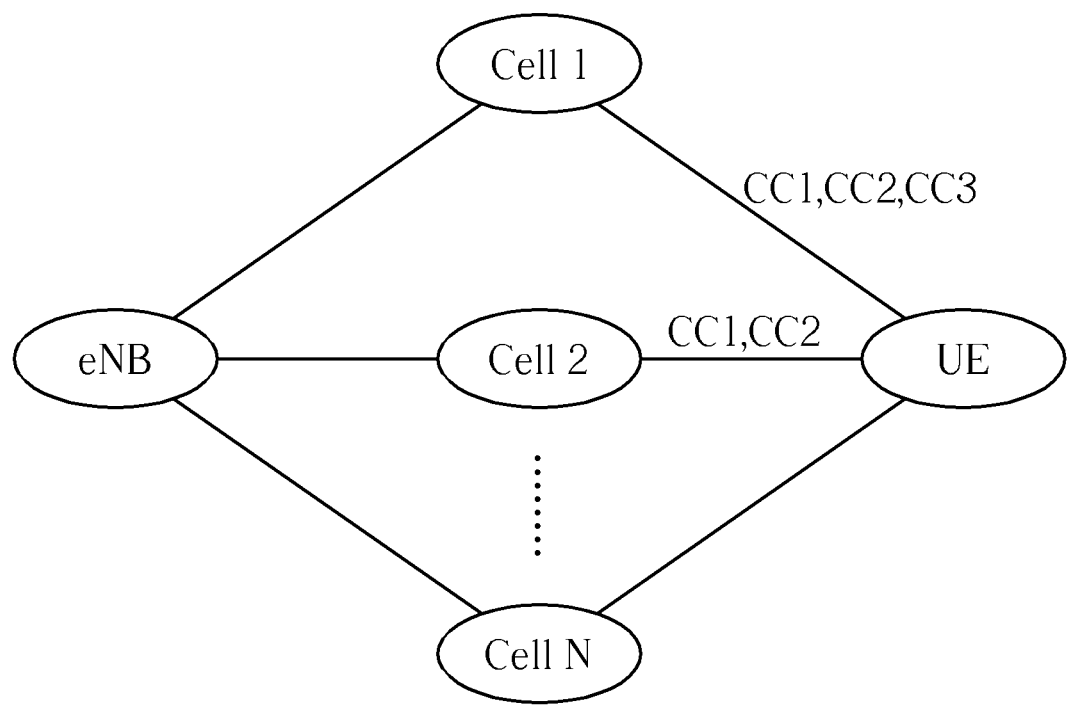
FIG. 2 is a schematic diagram of a user equipment and multiple cells under an eNB in the conventional wireless communication system in FIG. 1.

Please refer to FIG. 2, which is a schematic diagram of a UE and multiple cells under an eNB in the wireless communication system 10. The UE communicates with Cell 1 to Cell N, and each cell can transmit and receive on two or more component carriers since the wireless communication system 10 is an LTE-A system supporting carrier aggregation. As an example of FIG. 2, the UE establishes links with Cell 1 by component carriers CC1, CC2, and CC3, and establishes links with Cell 2 by the component carriers CC1 and CC2, and so on.

Figure 3:
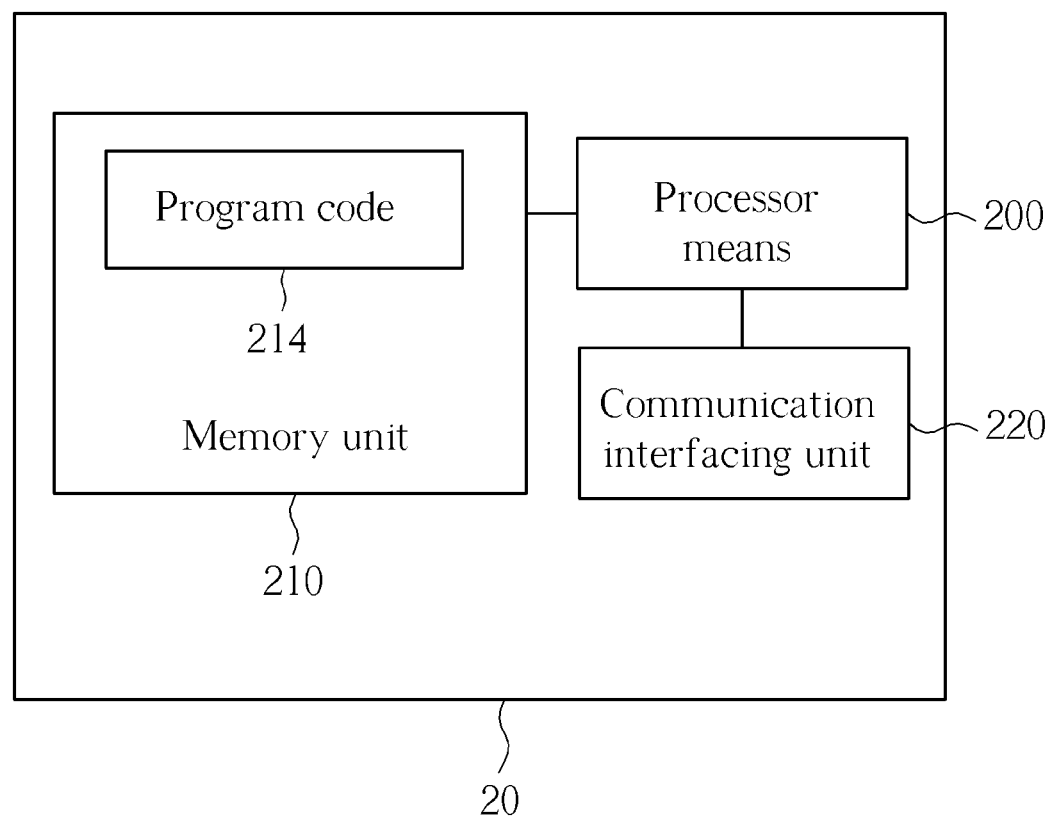
FIG. 3 is a schematic diagram of an exemplary communication device.

Please refer to FIG. 3, which is a schematic diagram of a communication device 20 according to an example of the present disclosure. The communication device 20 can be the UE shown in FIG. 1 and FIG. 2, and includes a processor means 200, a memory unit 210, and a communication interfacing unit 220. The memory unit 210 is any data storage device that stores storage data, including a program code 214, thereafter read and processed by the processor means 200.

Examples of the memory unit 210 include a subscriber identity module (SIM), read-only memory (ROM), random-access memory (RAM), CD-ROMs, magnetic tapes, floppy disks, optical data storage devices, and carrier waves (such as data transmission through the Internet). The communication interfacing unit 220 is coupled to the processor means 200, and is preferably a radio transceiver for wirelessly communicating with the network.

Figure 4:
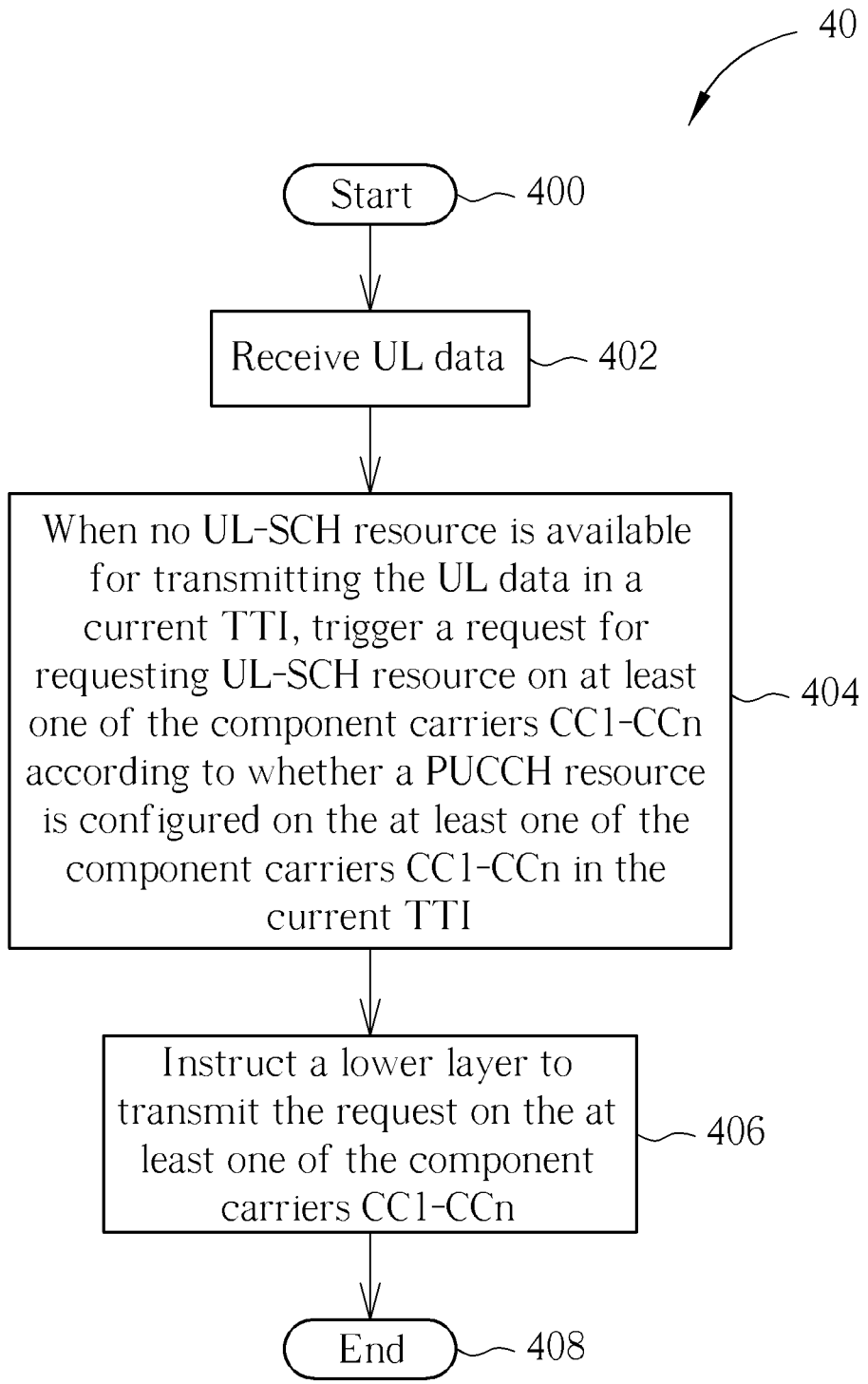
FIG. 4 is a flowchart of an exemplary process.

The general idea of the present disclosure is to utilize multiple component carriers to handle UL information, including scheduling request (SR), buffer status report (BSR), and power headroom report (PHR). Different component carrier should have its own UL resource to sent request, which may be an SR or a random access preamble, for requesting uplink shared channel (UL-SCH) resource. Please refer to FIG. 4, which is a flowchart of an exemplary process 40. The process 40 is utilized in the MAC layer of a UE in the wireless communication system 10, for handling a request for requesting UL-SCH resource under carrier aggregation of component carriers CC1-CCn. The process 40 can be compiled into the program code 214 and includes the following steps:

Step 400: Start.
Step 402: Receive UL data.
Step 404: When no UL-SCH resource is available for transmitting the UL data in a current transmission time interval (TTI), trigger a request for requesting UL-SCH resource on at least one of the component carriers CC1-CCn according to whether a physical uplink control channel (PUCCH) resource is configured on the at least one of the component carriers CC1-CCn in the current TTI.
Step 406: Instruct a lower layer to transmit the request on the at least one of the component carriers CC1-CCn.
Step 408: End.

To begin with, the UE MAC layer receives UL data from a higher layer, the radio resource control (RRC) layer. When no UL-SCH resource is available for transmitting the UL data in the current TTI, the UE MAC layer triggers a request to request UL-SCH resource according to Step 404, and instructs the lower layer, the physical (PHY) layer, to transmit the request to the eNB according to Step 406. The process 40 implies that even if multiple component carriers are configured with the UE, the UE may still use only one component carrier, or may use all of the component carriers to transmit the request for requesting UL-SCH resource. The request indicates an SR or a random access preamble, and which one is triggered depends on whether the PUCCH resource is configured on each component carrier. Based on the above, Step 404 and Step 406 may be implemented by several alternatives as follows.

The first alternative is that when the PUCCH resource is configured on an anchor component carrier, which is a component carrier that the UE can detect and camp on in an radio resource control (RRC) idle mode, of the component carriers CC1-CCn in the current TTI, the UE MAC layer triggers the SR on the anchor component carrier (Step 404), and instructs the physical layer to transmit the SR on the anchor component carrier (Step 406). In this case, the SR is not triggered and transmitted on the component carriers other than the anchor component carrier.

The second alternative is that when the PUCCH resource is configured on the each of the component carriers CC1-CCn in the current TTI, the UE MAC layer triggers the SR on each of the component carriers CC1-CCn (Step 404), and instructs the physical layer to transmit the SR on each of the component carriers CC1-CCn (Step 406). In other words, the SR is triggered and transmitted on all of the component carriers CC1-CCn.

The third alternative is that when no PUCCH resource is configured on the component carriers CC1-CCn in the current TTI, a physical random access channel (PRACH) resource is used instead. The UE MAC layer triggers the random access preamble on an anchor component carrier (Step 404), and instructs the physical layer to transmit the random access preamble on the PRACH resource on the anchor component carrier (Step 406).

The fourth alternative is that when no PUCCH resource is configured on the component carriers CC1-CCn in the current TTI, the UE MAC layer triggers the random access preamble on each of the component carriers CC1-CCn (Step 404), and instructs the physical layer to transmit the random access preamble on the PRACH resource on each of the component carriers CC1-CCn (Step 406). Similar to the SR transmission, the random access preamble may be also triggered and transmitted on the anchor carrier, or on all of the component carriers CC1-CCn.

After the eNB receives the SR or the random access preamble, the eNB assigns an UL grant for new transmission to the UE, and therefore the UE has UL-SCH resource to transmit UL data. Solutions to a pending SR under carrier aggregation are further provided. One is to keep the SR on each of the component carriers CC1-CCn pending until new UL-SCH resource is granted by an UL grant assigned on any one of the component carriers CC1-CCn, which is usually the first UL grant. In other words, after the SR is transmitted by the PUCCH resource on a component carrier, the transmitted SR is considered pending until new UL-SCH resource is granted by an UL grant on any one of the component carriers CC1-CCn. The pending SRs on the component carriers CC1-CCn are cancelled by the first UL-SCH resource allocated on any component carrier.

The other is to keep the SR on one of the component carriers CC1-CCn pending until new UL-SCH resource is granted by the first UL grant which is assigned on the same component carrier. For example, the triggered SRs on the component carrier CC1 and on the component carrier CC2 remain pending; the pending SR on the component carrier CC2 is only cancelled by the first UL grant on the component carrier CC2, and is not cancelled by the first UL grant on the component carrier CC1 even if the component carrier CC1 is the anchor component carrier.

Figure 5A:
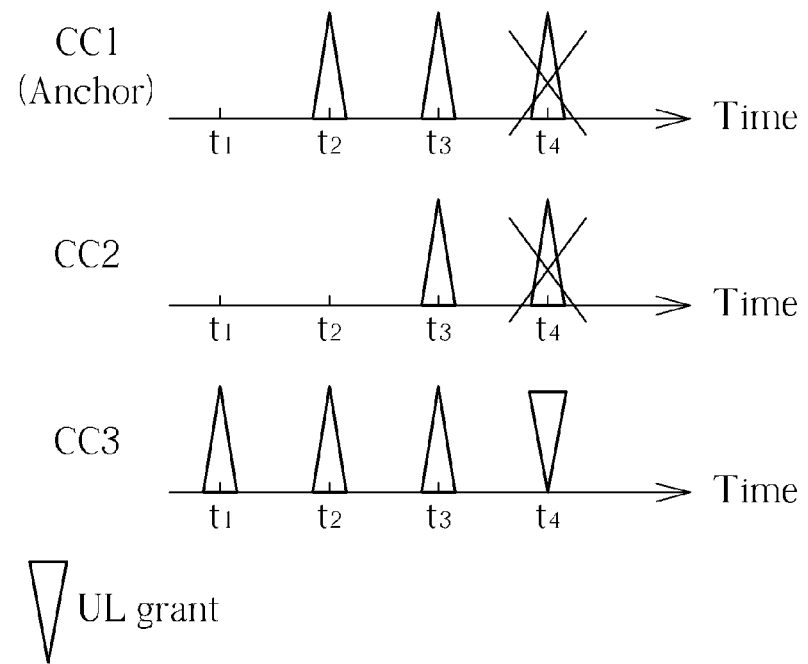
FIG. 5A and FIG. 5B are exemplary timing diagrams illustrating how a scheduling request is triggered, transmitted, and cancelled.
Figure 5B:
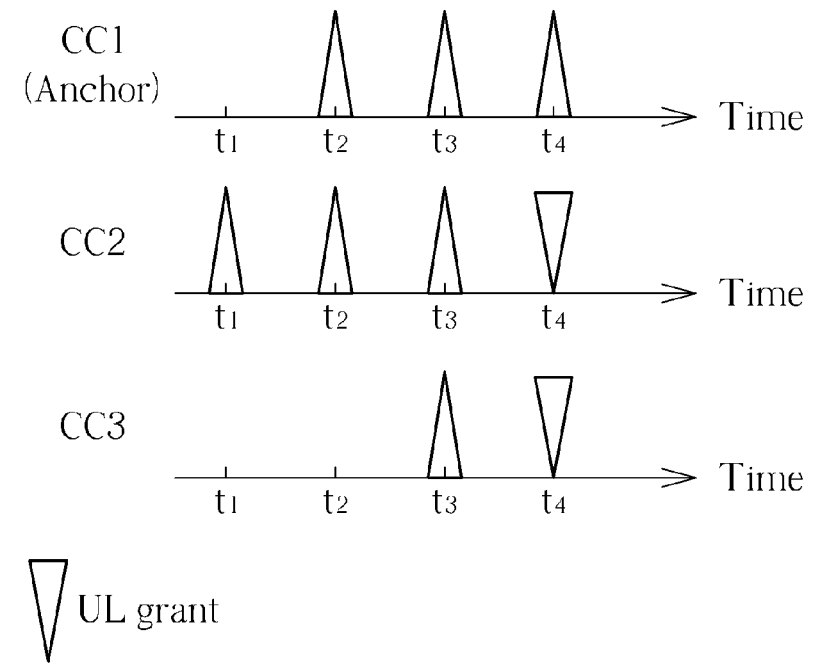

Please refer to FIG. 5A and FIG. 5B, which are timing diagrams illustrating how the SR is triggered, transmitted, and cancelled under three component carriers CC1-CC3 according to the second alternative of the process 40 and the above solutions for pending SR, where the anchor component carrier is CC1. As shown in FIG. 5A, the SR is triggered and transmitted on the component carriers CC1-CC3 at different time; when the first new UL-SCH resource is granted by the first UL grant on the component carrier CC3 at a time point $t_4$, pending SRs on the component carriers CC1-CC3 are cancelled. As shown in FIG. 5B, the SR is triggered and transmitted on the component carriers CC1-CC3 at different time; when UL-SCH resources are allocated by UL grants on the component carriers CC2 and CC3 at a time point $t_4$, the SR on the component carrier CC1 still remains pending and is not cancelled. The pending SR on each of the component carriers CC1-CC3 is cancelled only by the UL grant on the same carrier.

Figure 6:
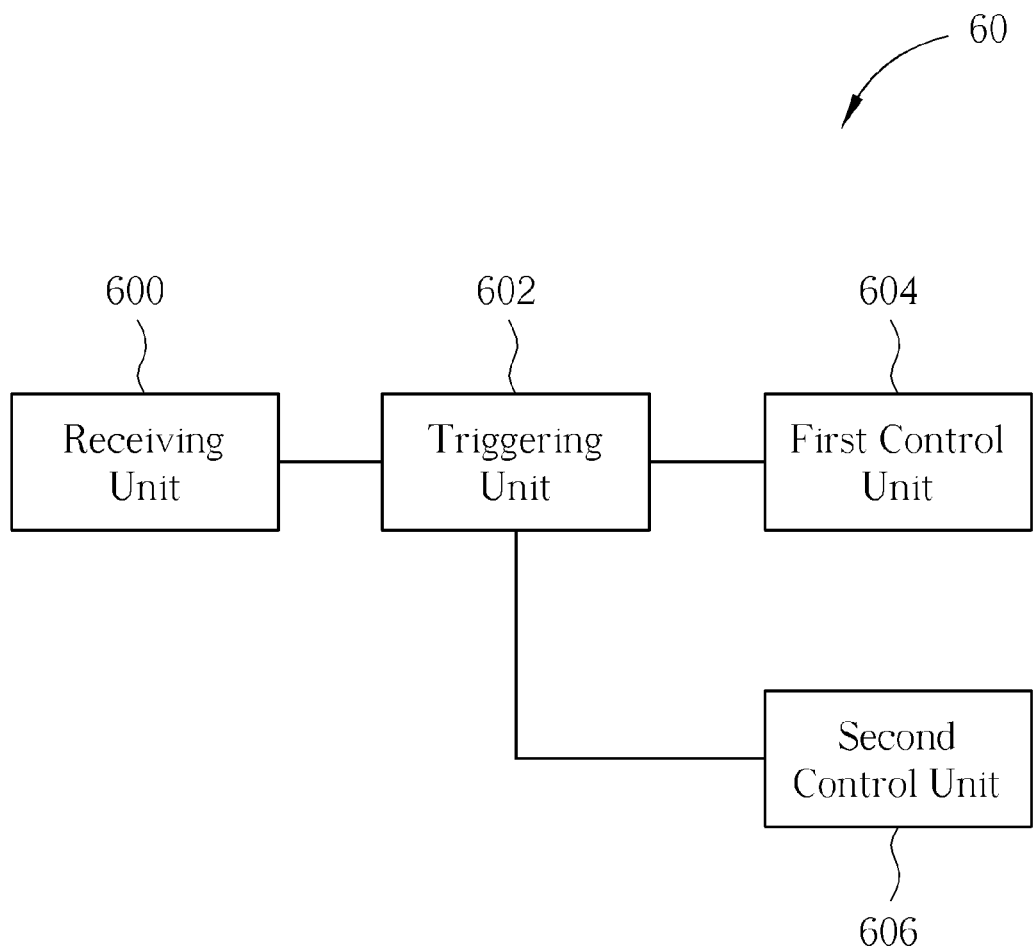
FIG. 6 is a schematic diagram of an exemplary communication device.

Please refer to FIG. 6, which is a schematic diagram of an exemplary communication device 60. The communication device 60 is a system implementation of the process 40 in FIG. 4, and is installed in the UE. The communication device 60 comprises a receiving unit 600, a triggering unit 602, a first control unit 604, and a second control unit 606. The receiving unit 600 is utilized for performing Step 402 of receiving UL data. The triggering unit 602 is coupled to the receiving unit 600, and is utilized for performing Step 404. The first control unit 604 is coupled to the triggering unit 602, and is utilized for performing Step 406. The second control unit 606 is coupled to the triggering unit 602, and is utilized for selectively performing the solutions for pending SR cancellation. Please refer to the process 40 for understanding the communication device 60, which is not repeated herein.

Figure 7:
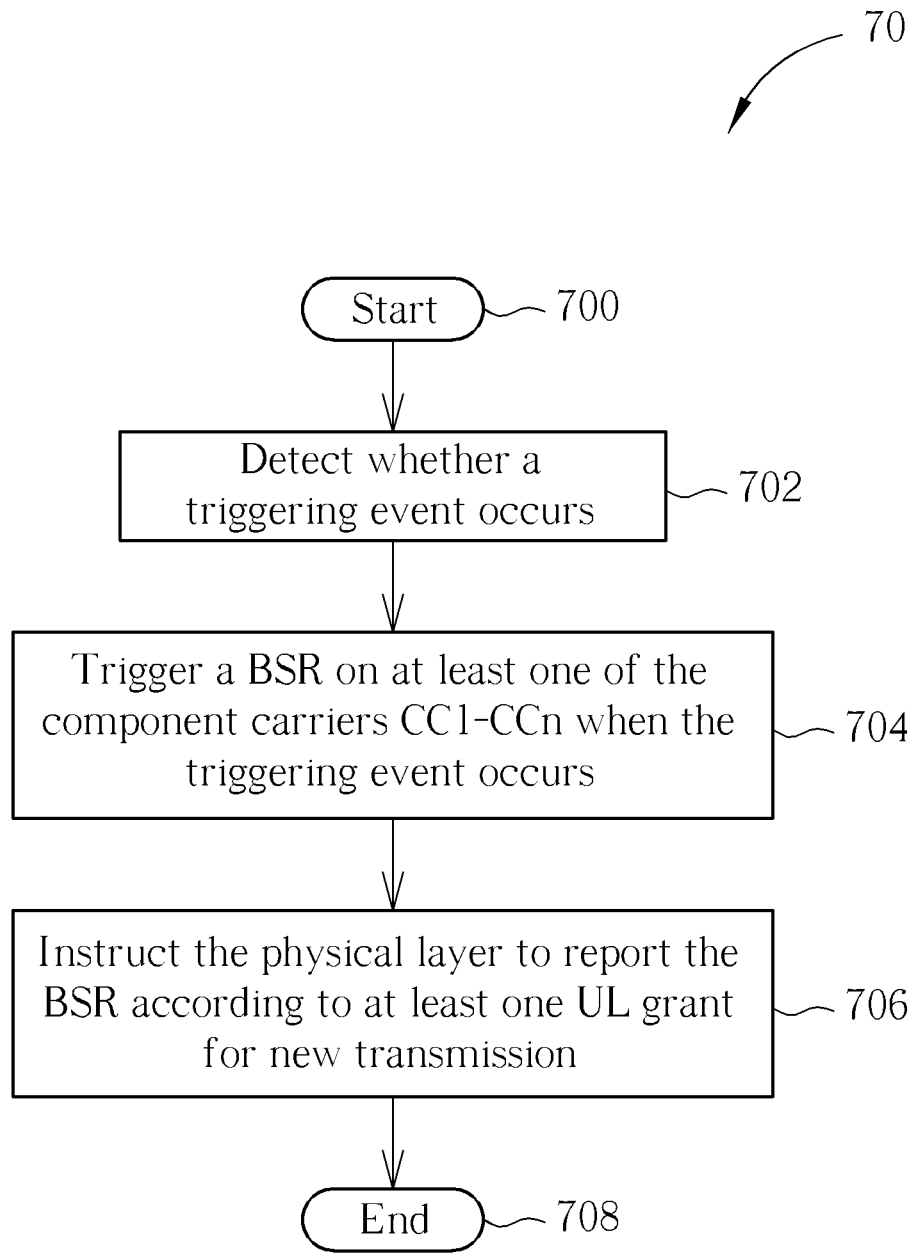
FIG. 7 is a flowchart of an exemplary process.

Each component carrier has its own BSR configuration is also considered. Please refer to FIG. 7, which is a flowchart of an exemplary process 70. The process 70 is utilized in the UE MAC layer for handling BSR under carrier aggregation of the component carriers CC1-CCn. The process 70 can be compiled into the program code 214 and includes the following steps:

Step 700: Start.
Step 702: Detect whether a triggering event occurs.
Step 704: Trigger a BSR on at least one of the component carriers CC1-CCn when the triggering event occurs.
Step 706: Instruct the physical layer to report the BSR according to at least one UL grant for new transmission.
Step 708: End.

Note that the BSR on different component carrier indicates the same information that is the size of UL data available in a UE transmission buffer. Different triggering events cause BSRs of different types, such as regular BSR and periodic BSR, which are specified following the current MAC specification and are not given herein. In Step 702, the UE MAC layer detects whether a trigger event occurs so as to decide to trigger a BSR or not. When detecting that the triggering event occurs, the UE MAC layer triggers a BSR on at least one of the component carriers CC1-CCn, and instructs the physical layer to report the BSR according to at least one UL grant for new transmission, i.e. to report the BSR on UL-SCH resources allocated by the at least one UL grant.

The process 70 implies that even if multiple component carriers are configured with the UE, the UE may use only one component carrier, or may use all of the component carriers to report the BSR. Please note that, a condition that the BSR can be triggered on one component carrier but reported on another component carrier may be considered. Based on the above reasons, Step 704 and Step 706 may be implemented by several alternatives as follows by which component carrier the BSR is triggered and reported on.

The first alternative is that the UE MAC layer triggers the BSR only on the anchor component carrier of the component carriers CC1-CCn when the triggering event occurs (Step 704), and certainly, the UE MAC layer instructs the physical layer to report the BSR according to the first UL grant for new transmission assigned on the anchor component carrier (Step 706).

The second alternative is that the UE MAC layer triggers the BSR on each of the component carriers CC1-CCn (Step 704), and instructs the physical layer to report the BSR according to the first UL grant for new transmission only on the anchor component carrier (Step 706).

The third alternative is that the UE MAC layer triggers the BSR on each of the component carriers CC1-CCn (Step 704), and instructs the physical layer to report the BSR according to the first UL grant assigned on any one of the component carriers CC1-CCn, which is not necessary to be the anchor component (Step 706). For example, when three component carriers CC1-CC3 are configured with the UE, where the component carrier CC1 is the anchor component carrier, the BSR can be triggered on all of the component carriers CC1-CC3 but reported on the component carrier CC2 or CC3. Furthermore, in a special condition when more than one UL grant is assigned on different component carriers in the same TTI, the UE MAC layer instructs the physical layer to report the BSR according to an UL grant which has a larger size among these UL grants on the same TTI. In other words, the BSR is reported on a component carrier where the first UL grant has a large size than other UL grants on other component carriers.

The fourth alternative is that the UE MAC layer triggers the BSR on each of the component carriers CC1-CCn (Step 704), and instructs the physical layer to report the BSR triggered on the each of the component carriers CC1-CCn according to the first uplink grant assigned on the same component carrier (Step 706). That is, the BSR is triggered and reported independently. For example, when three component carriers CC1-CC3 are configured with the UE, where the component carrier CC1 is the anchor component carrier, the BSR triggered on the component carrier CC1 is only reported according to the first UL grant assigned on the component carrier CC1, and the BSR triggered on the component carrier CC2 is only reported according to the first UL grant assigned on the component carrier CC2, and so on.

In addition to the process 70, two different solutions to handle pending BSR triggers are further provided. One is that once the BSR is reported, no matter which component carrier the BSR is reported on, the UE MAC layer cancels all pending BSR triggers on all of the used component carriers, which may be the anchor component carrier or all of the component carriers CC1-CCn. The other is that once the BSR is reported, the UE cancels a pending BSR trigger on one of the used component carriers only when the BSR is also reported on the same component carrier. For example, a pending BSR trigger on the component carrier CC1 is cancelled only when the BSR is reported on the component carrier CC1, and is not cancelled when the BSR is reported by the component carrier CC2.

Figure 8A:
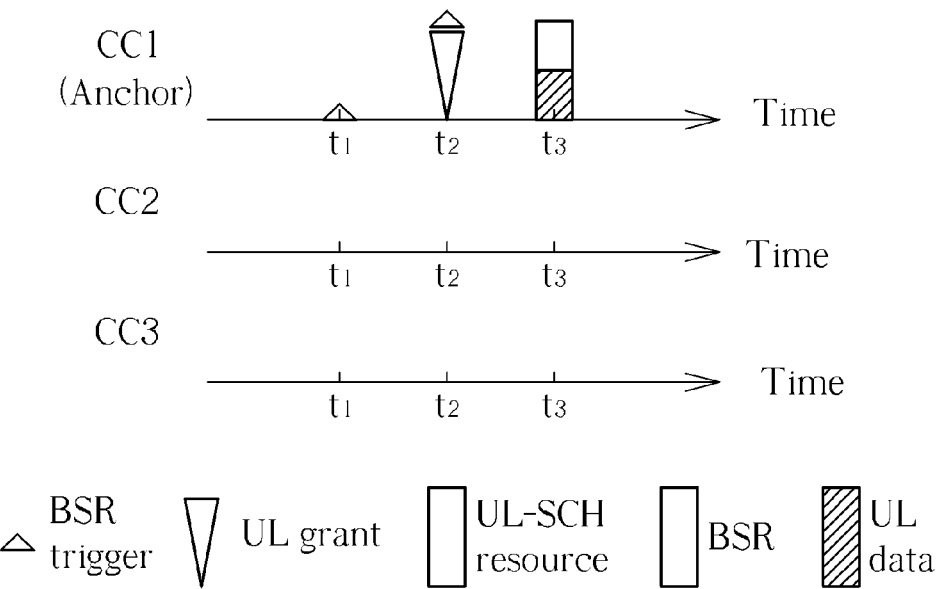
FIG. 8A to FIG. 8D are exemplary timing diagrams illustrating how a buffer status report is triggered, reported, and cancelled.
Figure 8B:
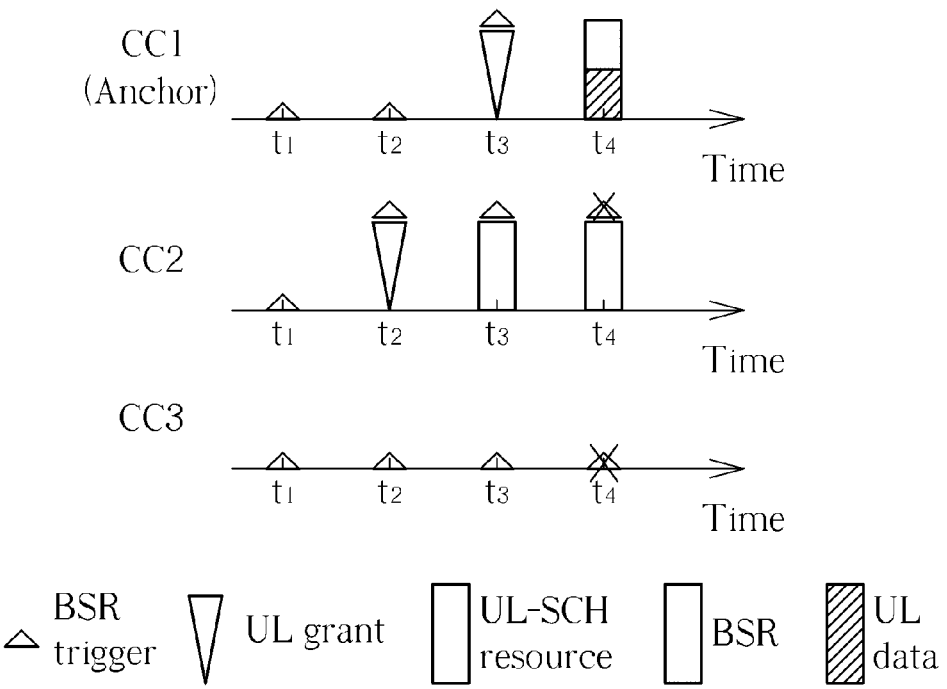

Please refer to FIG. 8A to FIG. 8D, which are timing diagrams illustrating how the BSR is triggered, reported, and cancelled under three component carriers CC1-CC3 according to aforementioned four different solutions of the process 70 and solutions to pending BSRs, where the anchor component carrier is the component carrier CC1. FIG. 8A illustrates the first solution that the BSR is triggered and reported only on the anchor component carrier CC1. FIG. 8B illustrates the second solution that the BSR is triggered on each component carrier but reported only on the anchor component carrier CC1; even though the first UL grant is assigned on the component carrier CC2 at a time point $t_2$, and the first UL-SCH resource is on the component CC2 at a time point $t_3$, the BSR is reported until at a time point $t_4$ when the first UL-SCH resource is on the anchor component carrier CC1; pending BSR triggers on the component carriers CC2 and CC3 are cancelled once the BSR is reported at the time point $t_4$.

Figure 8C:
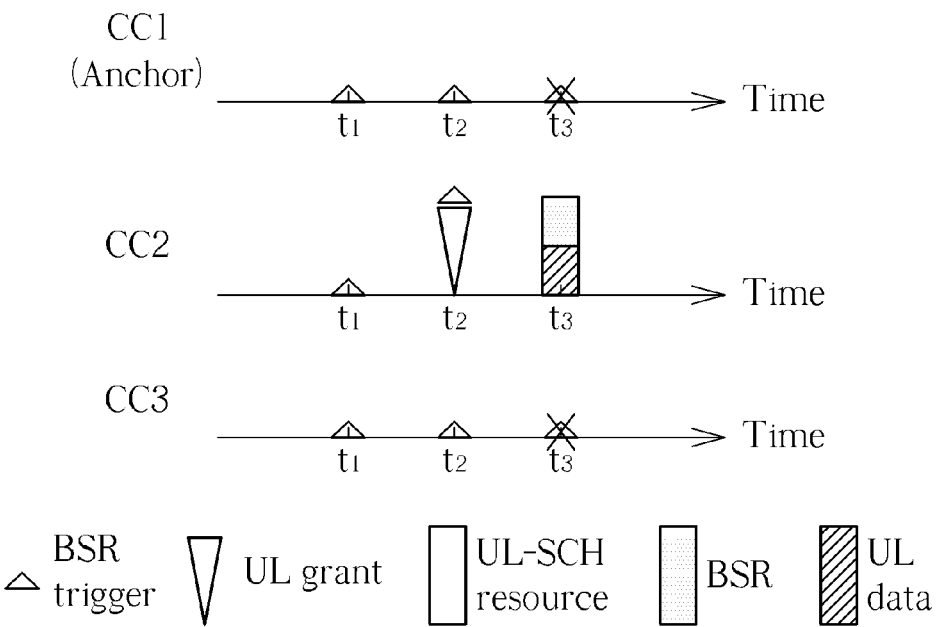
Figure 8D:
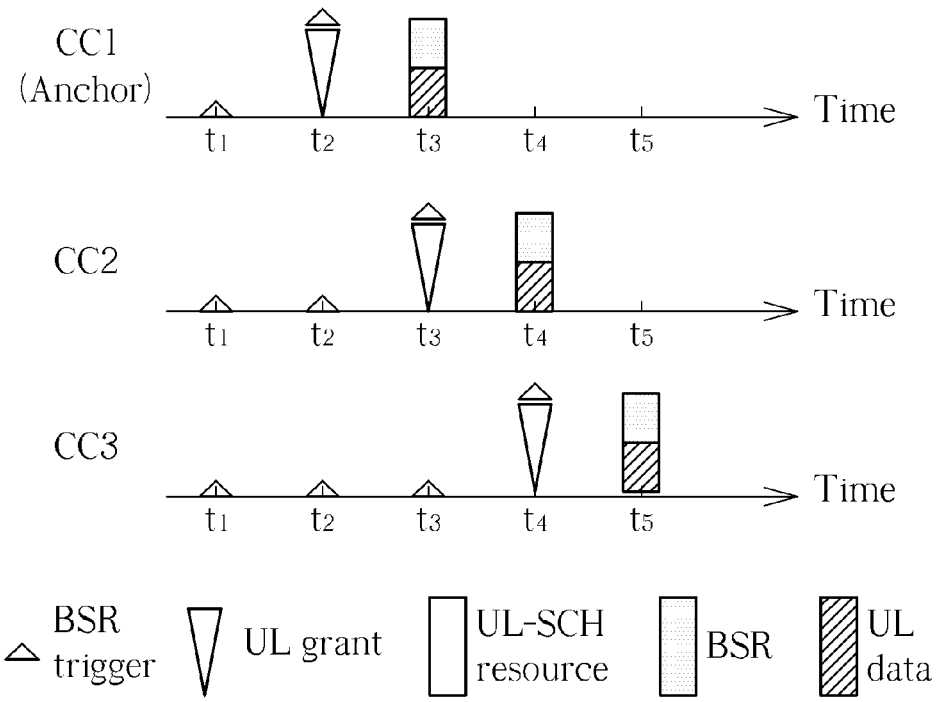

FIG. 8C illustrates the third solution that the BSR is triggered on each component carrier and is reported according to the first UL grant on any one of the component carriers CC1-CC3. In FIG. 8C, the BSR is reported according to the first UL grant assigned on the component carrier CC2 at a time point $t_2$; once the BSR is reported at a time point $t_3$, pending BSR triggers on the component carriers CC1-CC3 are cancelled. FIG. 8D illustrates the fourth solution that the BSR is triggered on each component carrier, and is reported and cancelled on the same component carrier. As can be seen in FIG. 8D, when the BSR is reported on the component carrier CC1 at a time point $t_3$, pending BSR triggers on the component carriers CC2 and CC3 remain pending and are not cancelled; also, when the BSR is reported on the component carrier CC2 later at a time point $t_4$, the pending BSR on the component carrier CC3 still remains pending and is not cancelled.

Figure 9:
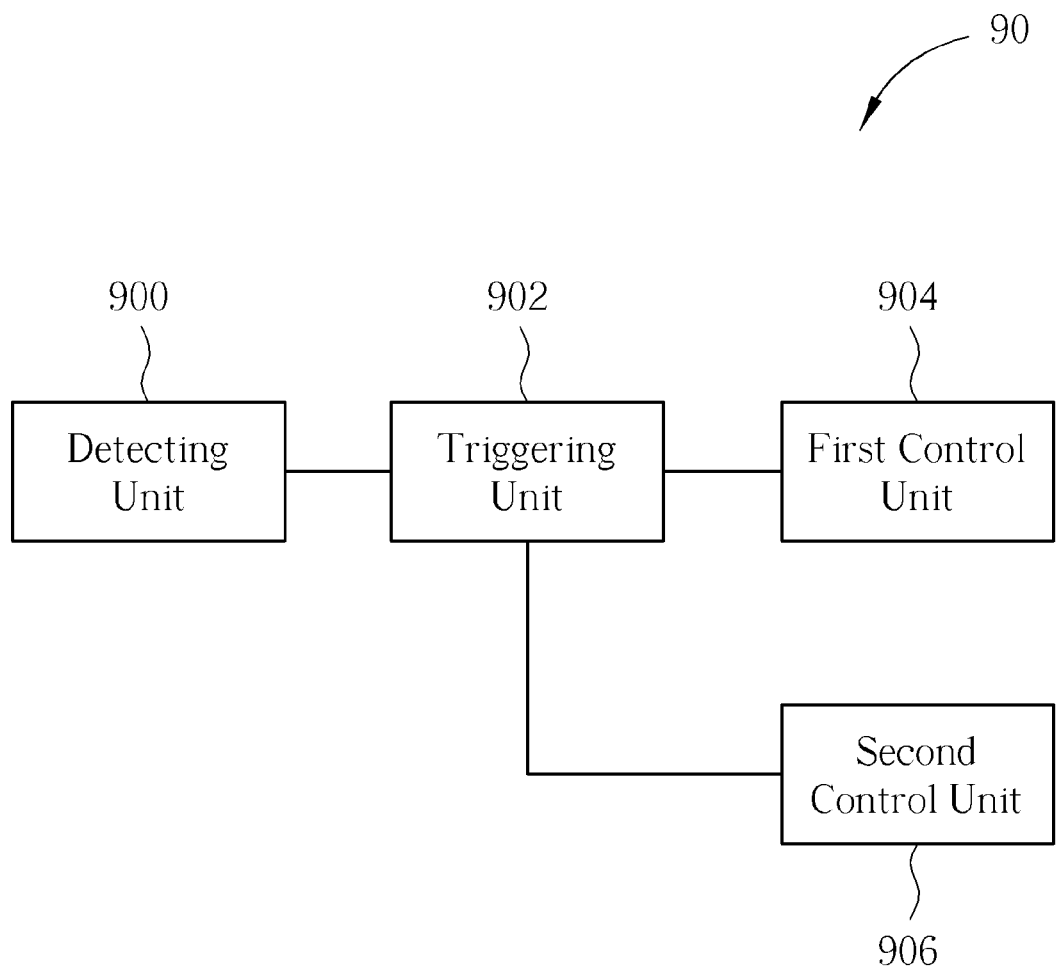
FIG. 9 is a schematic diagram of an exemplary communication device.

Please refer to FIG. 9, which is a schematic diagram of an exemplary communication device 90. The communication device 90 is a system implementation of the process 70 in FIG. 7 installed in the UE. The communication device 90 comprises a detecting unit 900, a triggering unit 902, a first control unit 904, and a second control unit 906. The detecting unit 900 is utilized for performing Step 702 of detecting whether a triggering event occurs. The triggering unit 902 is coupled to the detecting unit 900, and is utilized for performing Step 704, for triggering a BSR on the anchor component carrier or on all of the component carriers. The first control unit 904 is coupled to the triggering unit 902, and is utilized for performing Step 706 of instructing the physical layer to report the BSR according to the first UL grant, which may be on the anchor component carrier, any one of the component carriers, or each of the component carriers. The second control unit 906 is coupled to the triggering unit 902, and is utilized for performing solutions for cancelling all pending BSR triggers once the BSR is reported, or cancelling a pending BSR trigger on a component carrier the same as which component carrier the BSR is reported on. Operation of the communication device 90 is detailed described in the process 70, and is not repeated herein.

Figure 10:
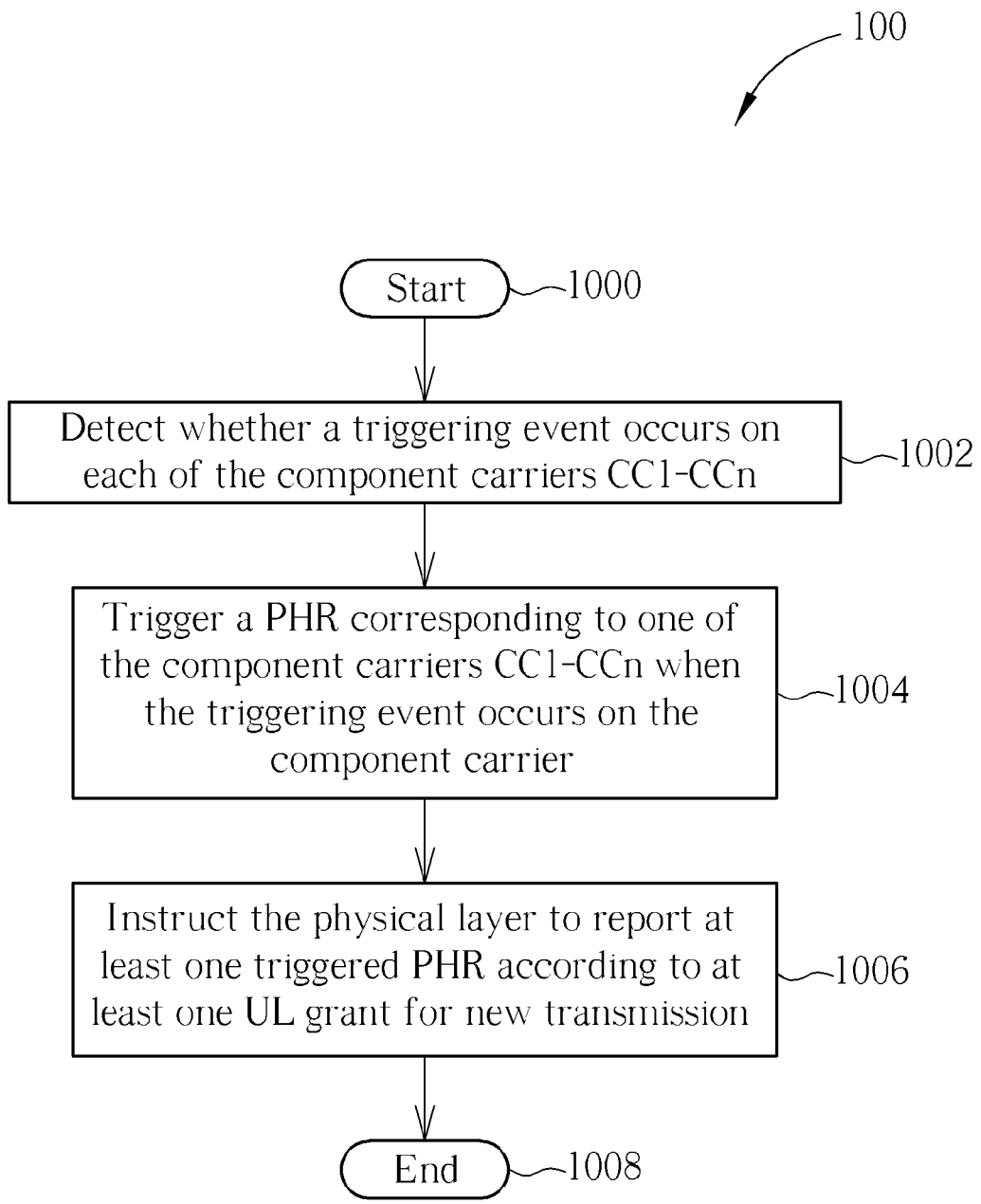
FIG. 10 is a flowchart of an exemplary process.

Similar to BSR, a condition that each of the component carriers CC1-CCn has its own PHR configuration is also considered. Please refer to FIG. 10, which is a flowchart of an exemplary process 100. The process 100 is utilized in the UE MAC layer for handling PHR under carrier aggregation of the component carriers CC1-CCn. The process 100 can be compiled into the program code 214 and includes the following steps:

Step 1000: Start.

Step 1002: Detect whether a triggering event occurs on each of the component carriers CC1-CCn.

Step 1004: Trigger a PHR corresponding to one of the component carriers CC1-CCn when the triggering event occurs on the component carrier.

Step 1006: Instruct the physical layer to report at least one triggered PHR according to at least one UL grant for new transmission.

Step 1008: End.

A PHR indicates the power headroom level of a corresponding component carrier. PHRs, denoted as P1-Pn, on the component carriers CC1-CCn may be triggered at different time since the transmit power of each component carrier is estimated independently. Triggering events that cause PHR are specified in the current MAC specification and are not given herein. By using Step 1002 and Step 1004, the UE MAC layer detects whether a triggering event occurs on each of the component carriers in a current TTI, and triggers a PHR Pi which indicates the power headroom level on one of the component carriers CC1-CCn, called a component carrier CCi, when detecting the triggering event occurs on the component carrier CCi. After Step 1002 and Step 1004 are performed, when there is at least one triggered PHR waiting to be reported, the UE instructs the physical layer to report the at least one triggered PHR according to at least one UL grant for new transmission by using Step 1006, which implies that the triggered PHR(s) may be reported on one or more than one component carrier. For this reason, Step 1006 may be implemented by several alternatives as follows.

The first alternative is that the UE MAC layer instructs the physical layer to report the at least one triggered PHR (which may not be as many as the component carriers CC1-CCn) according the first UL grant assigned only on the anchor component carrier. In other words, all of the triggered PHRs are reported on an UL-SCH resource allocated by the first UL grant assigned on the anchor component carrier.

The second alternative is that the UE MAC layer instructs the physical layer to report the at least one triggered PHR according the first UL grant assigned on any one of the component carriers CC1-CCn, which is not limited to be the anchor component carrier.

The third alternative is that the UE MAC layer instructs the physical layer to report each of the PHRs P1-Pn corresponding to the component CC1-CCn according to the first uplink grant assigned on the same component carrier, i.e., the PHRs are reported independently. For example, when the PHR P2 indicating the power headroom level of the component carrier CC2 is triggered, the PHR P2 is reported only on an UL-SCH resource allocated by the first UL grant assigned on the component carrier CC2.

In addition to the process 100, two different solutions to handle pending PHR triggers are further provided. One is used after performing the first or the second alternative of Step 1006, which is that once all of the at least one triggered PHR is reported, the UE MAC layer cancels all pending PHR triggers on used component carriers where the at least one triggered PHR is already reported; PHR triggers for those PHRs not yet reported remain pending. The other is used after the third alternative of Step 1006, which is that the UE MAC layer cancels a pending PHR trigger on one of the component carriers CC1-CCn once a PHR corresponding to the same component carrier is reported, i.e. the PHR triggers are cancelled independently.

Figure 11A:
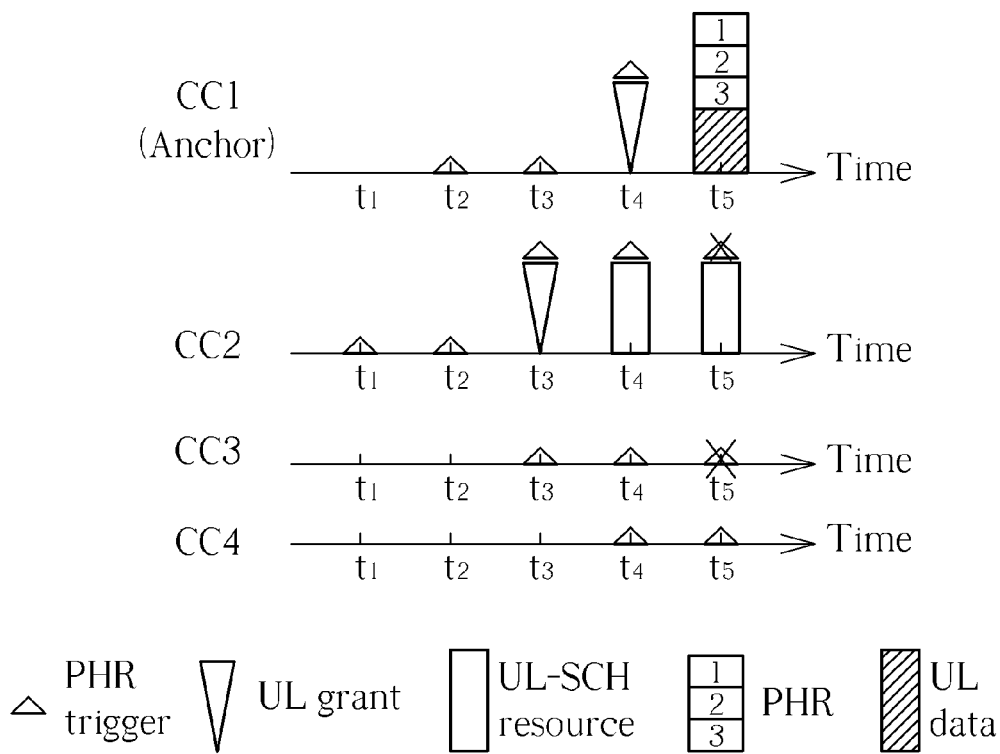
FIG. 11A to FIG. 11C are exemplary timing diagrams illustrating how a power headroom report is triggered, reported, and cancelled.
Figure 11B:
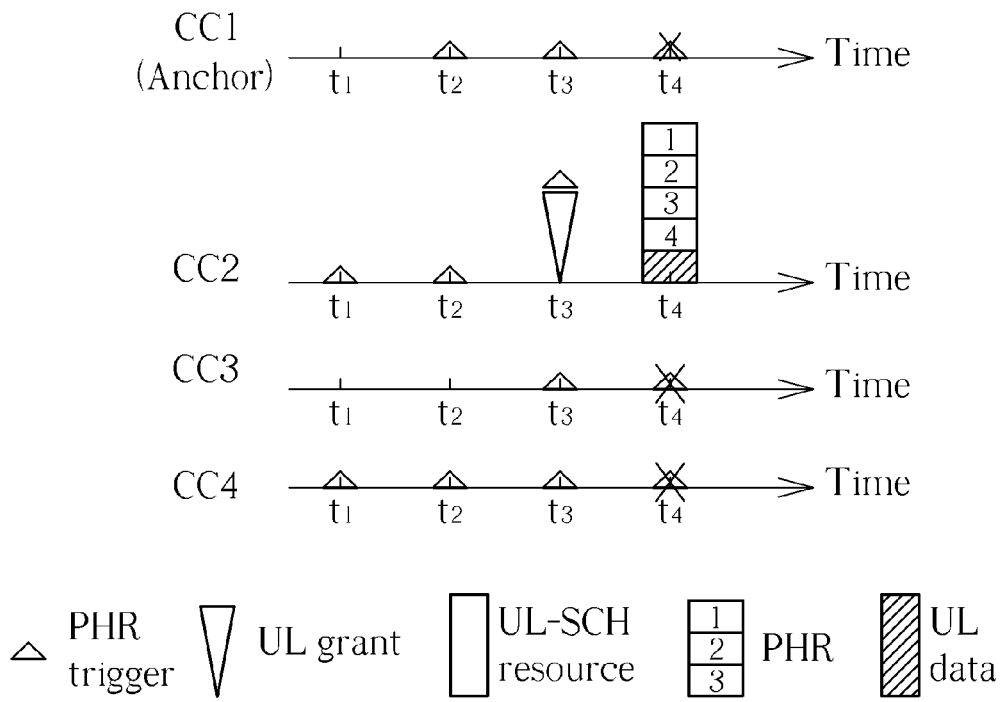
Figure 11C:
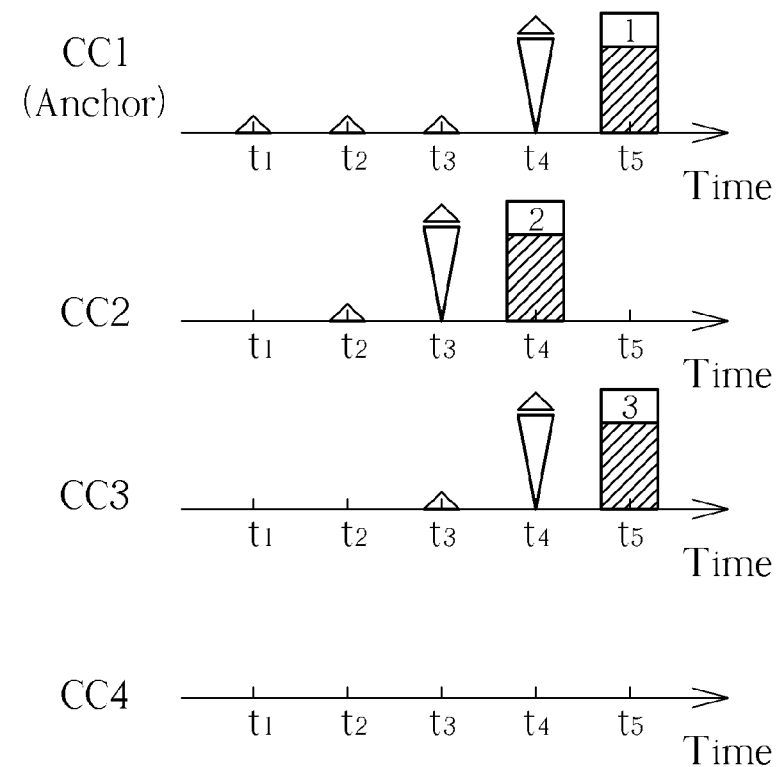
Figure 11C:

Please refer to FIG. 11A to FIG. 11C, which are timing diagrams illustrating how PHRs are triggered, reported, and cancelled under four component carriers CC1-CC4 according to aforementioned three different alternatives of the process 100 and solutions to pending PHRs, where the anchor component carrier is CC1. PHRs corresponding to the component carriers CC1-CC4 are denoted as P1-P4. FIG. 11A illustrates the first solution. As shown in FIG. 11A, the PHRs P1-P4 are triggered at different times, respectively. The first UL grant is assigned on the component carrier CC2 at a time point $t_3$, but the PHRs P1-P3 are reported by an UL-SCH resource at a time point $t_5$, which is allocated by the first UL grant assigned on the anchor component carrier CC1 at a time point $t_4$, and the PHR P4 is not reported. Pending PHR triggers on the component carriers CC1-CC3 are cancelled once the PHRs P1-P3 are reported, while a PHR trigger on the component carrier CC4 remains pending.

FIG. 11B illustrates the second solution. In FIG. 11B, the PHRs P1-P4 are triggered at different times, and the PHRs P1-P4 are reported by an UL-SCH resource on the component carrier CC2 where the first UL grant is assigned. Once the PHRs P1-P4 are reported at a time point $t_4$, all pending PHR triggers on the component carriers CC1-CC4 are cancelled. FIG. 11C illustrates the third solution in which the PHR report and cancellation are independent. In FIG. 11C, the PHRs P1-P3 are triggered at different times. For example, at a time point $t_4$, only the PHR P2 is reported by the first UL-SCH resource on the component carrier CC2, and PHR triggers on the component carriers CC1 and CC3 remain pending at the time point $t_4$. No PHR trigger is on the component carrier CC4.

As mentioned previously, the first two bits of a PHR MAC control element are reserved bits. Under carrier aggregation, the two reserved bit can be used to indicate which component carrier a reported PHR corresponds to, and thereby the eNB can recognize the component carrier related to the reported PHR when the eNB receives a PHR MAC control element.

Figure 12:
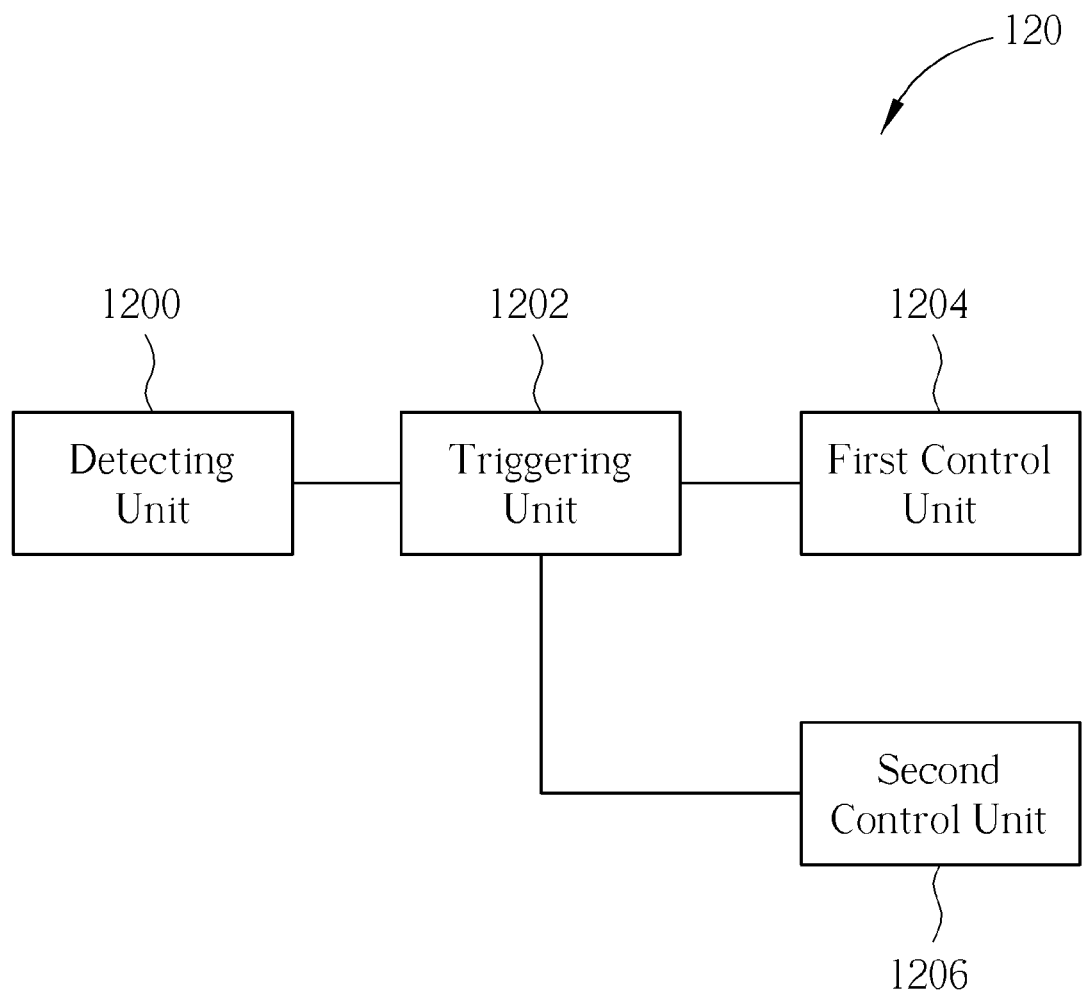
FIG. 12 is a schematic diagram of an exemplary communication device.

Please refer to FIG. 12, which is a schematic diagram of an exemplary communication device 120. The communication device 120 is a system implementation of the process 100 in FIG. 10 installed in the UE. The communication device 120 comprises a detecting unit 1200, a triggering unit 1202, a first control unit 1204, and a second control unit 1206. The detecting unit 1200 is utilized for performing Step 1002. The triggering unit 1202 is coupled to the detecting unit 1200, and is utilized for performing Step 1004. The first control unit 1204 is coupled to the triggering unit 1202, and is utilized for selectively performing the three alternatives of Step 1006 for reporting the triggered PHRs. The first control unit 1204 is also utilized for indicating which component carrier a reported PHR corresponds to by using the reserved bits in the PHR MAC control element. The second control unit 1206 is coupled to the triggering unit 1202, and is utilized for selectively performing two solutions of handling pending PHR triggers after the triggered PHRs are reported. Operation of the communication device 120 is detailed described in the process 100, and is not repeated herein.

Please note that the abovementioned steps of the processes 40, 70, 100 including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In summary, the exemplary methods and systems of handling uplink information including SR, BSR, and PHR for the UE supporting carrier aggregation are provided, so that the UE reports SR, BSR, and PHR more efficiently. Benefit from the methods and systems, the UE can receive UL resource as soon as possible, and therefore UL transmission is improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling uplink information under carrier aggregation for a medium access control (MAC) layer of a user equipment in a wireless communication system, the method comprising:
   detecting, by the user equipment, whether a triggering event occurs on each of a plurality of component carriers;
   triggering, by the user equipment, a power headroom report (PHR) corresponding to one of the plurality of component carriers when the triggering event occurs on the one of the plurality of component carriers; and
   transmitting, by the user equipment, at least one triggered PHR according to at least one uplink grant for new transmission.

2. The method of claim 1, wherein the step of transmitting the at least one triggered PHR according to at least one uplink grant for new transmission is transmitting the at least one triggered PHR according to an uplink grant assigned on an anchor component of the plurality of component carriers, an uplink grant assigned on any one of the plurality of component carriers, or an uplink grant assigned on the same component carrier.

3. The method of claim 1 further comprising:
   cancelling all pending PHR triggers on at least one component carrier where the at least one triggered PHR is reported once the at least one triggered PHR is reported, or cancelling a pending PHR trigger on one of the plurality of component carriers once a PHR corresponding to the same one of the plurality of component carriers is reported.

4. The method of claim 1 further comprising:
   indicating which component carrier that the reported PHR corresponds to in a PHR MAC control element.

5. A communication device of a wireless communication system for handling uplink information under carrier aggregation, the communication device comprising:
   a detecting unit for detecting whether a triggering event occurs on each of a plurality of component carriers;
   a triggering unit coupled to the detecting unit for triggering a power headroom report (PHR) corresponding to one of the plurality of component carriers when the triggering event occurs on the one of the plurality of component carriers; and
   a first control unit coupled to the triggering unit for transmitting at least one triggered PHR according to at least one uplink grant for new transmission.

6. The communication device of claim 5, wherein the first control unit transmits the at least one triggered PHR according to an uplink grant assigned on an anchor component of the plurality of component carriers.

7. The communication device of claim 5, wherein the first control unit transmits the at least one triggered PHR according to an uplink grant assigned on any one of the plurality of component carriers.

8. The communication device of claim 5, wherein the first control unit transmits each of the at least one triggered PHR according to an uplink grant assigned on the same component carrier.

9. The communication device of claim 5 further comprising a second control unit coupled to the triggering unit for cancelling all pending PHR triggers on at least one component carrier where the at least one triggered PHR is reported once the at least one triggered PHR is reported.

10. The communication device of claim 5 further comprising a second control unit coupled to the triggering unit for cancelling a pending PHR trigger on one of the plurality of component carriers once a PHR corresponding to the same one of the plurality of component carriers is reported.

11. The communication device of claim 5, wherein the first control unit is further utilized for indicating which component carrier the reported PHR corresponds to in a PHR MAC control element.

* * * * *